(12) United States Patent
Jain

(10) Patent No.: US 8,135,878 B1
(45) Date of Patent: Mar. 13, 2012

(54) METHOD AND APPARATUS FOR IMPROVING THROUGHPUT ON A COMMON BUS

(75) Inventor: Naveen K. Jain, San Jose, CA (US)

(73) Assignee: Tellabs San Jose Inc., Naperville, IL (US)

( * ) Notice: Subject to any disclaimer, the term of this patent is extended or adjusted under 35 U.S.C. 154(b) by 149 days.

(21) Appl. No.: 12/098,901

(22) Filed: Apr. 7, 2008

(51) Int. Cl.
*G06F 13/28* (2006.01)

(52) U.S. Cl. .......................... 710/22; 710/25

(58) Field of Classification Search ............... 710/22, 710/25
See application file for complete search history.

(56) References Cited

U.S. PATENT DOCUMENTS

| | | | |
|---|---|---|---|
| 5,608,879 A * | 3/1997 | Cooke | 710/110 |
| 5,948,089 A * | 9/1999 | Wingard et al. | 710/107 |
| 6,098,114 A * | 8/2000 | McDonald et al. | 710/5 |
| 6,496,740 B1 * | 12/2002 | Robertson et al. | 700/20 |
| 6,763,418 B1 * | 7/2004 | Chou et al. | 710/317 |
| 6,854,025 B2 * | 2/2005 | Knight et al. | 710/22 |
| 6,877,053 B2 * | 4/2005 | Lahiri et al. | 710/113 |
| 2008/0267211 A1 * | 10/2008 | Gangwal et al. | 370/458 |

\* cited by examiner

*Primary Examiner* — Chun-Kuan Lee
(74) *Attorney, Agent, or Firm* — James M. Wu; JW Law Group

(57) ABSTRACT

A bus scheduling device having a group of direct memory access ("DMA") engines, a group of target modules ("TM"), a read pending memory, and a bus arbiter is disclosed. A common bus, which is coupled with the DMA engines, TMs, and the read pending memory, is employed in the device for data transmission. DMA engines are capable of transmitting and receiving data to and from TMs via the common bus. The read pending memory is capable of storing information indicating the read status of the DMA engines. The arbiter or bus arbiter arbitrates bus access in response to a bus allocation scheme and the information stored in the read pending memory.

21 Claims, 6 Drawing Sheets

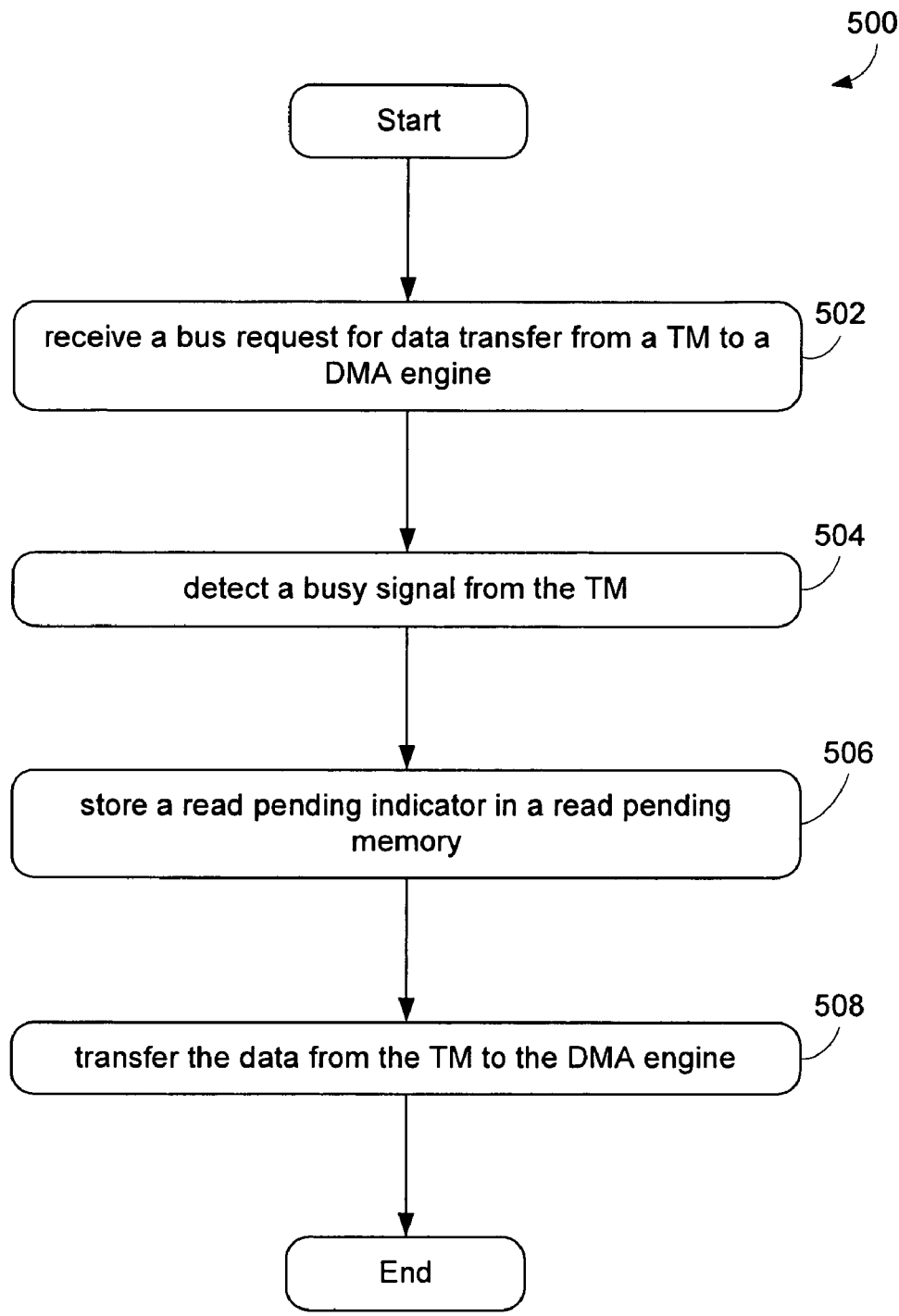

METHOD AND APPARATUS FOR IMPROVING THROUGHPUT ON A COMMON BUS

FIELD

The exemplary embodiment(s) of the present invention relates to network performance. More specifically, the embodiment(s) of the present invention relates to DMA bus scheduling for network communications.

BACKGROUND

As electronic technology progresses, integrated circuits ("IC") such as logical devices and buses are becoming increasingly complex. Bus architectures, which typically include dedicated buses and common buses, are often integral part of such progress to achieve higher performance with less silicon. Typical common bus architecture consists of a single bus that is shared among multiple devices in a computer system or subsystem. A purpose of using the common bus is to simplify IC layout with relatively simple bus hardware.

A problem associated with a common bus is that some devices attached to the bus require longer bus access times to complete their transactions than others. For example, when there are multiple direct memory access ("DMA") channels and all are trying to get access to a common bus, it is possible that one DMA channel can block other channels to create a bottleneck scenario. The bottleneck scenario can happen more often if latencies for getting data from different target modules are different in length.

A conventional approach to reduce the bottleneck scenario is to provide dedicated buses for devices that receive information with high latency. Dedicated buses typically increase hardware complexity and reduce overall bus performance. Another conventional approach to reduce the bottleneck scenario is to employ multiple common busses. For instance, when a first common bus is busy, requests may be redirected to a second common bus. The drawback for using multiple common buses is additional hardware and power usage.

SUMMARY

A bus management device providing bus access to a group of direct memory access ("DMA") engines and a group of target modules ("TMs") for data transmission is disclosed. Each TM includes set of registers, single/multiple memory devices, and a control circuitry, and is capable of generating a busy signal when additional time is needed for retrieving data. The device, in one embodiment, further includes an arbiter and a read pending memory, wherein the arbiter is configured to arbitrate bus access in accordance with a bus allocation scheme and the information stored in the read pending memory. The read pending memory is a storage memory for storing information indicating the status of DMA engines.

Additional features and benefits of the exemplary embodiment(s) of the present invention will become apparent from the detailed description, figures, and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 5 is a flowchart illustrating a process of scheduling access to a bus in accordance with one embodiment of the present invention.

DETAILED DESCRIPTION

Figure 1:
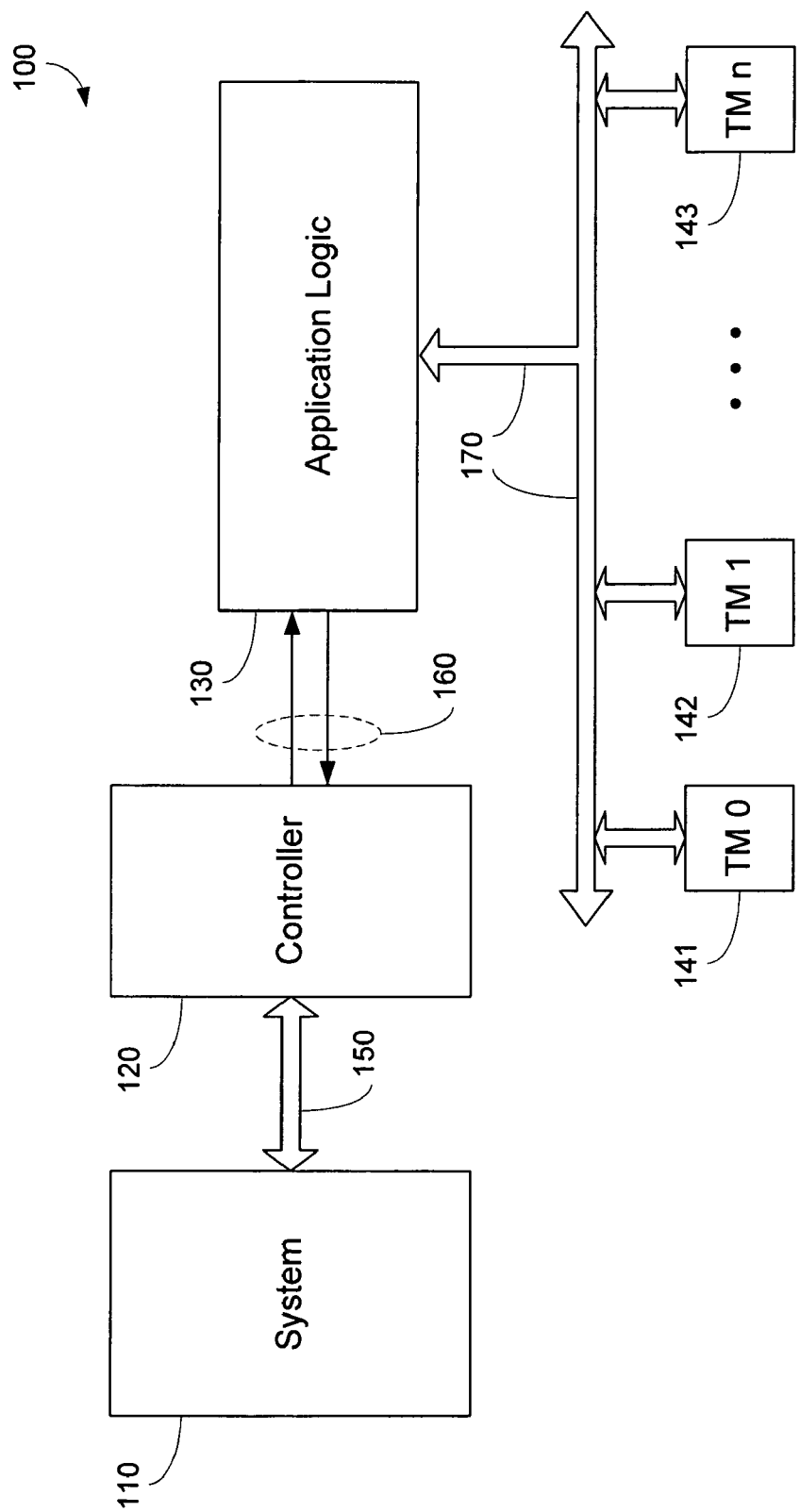
FIG. 1 is a block diagram illustrating a bus management system in accordance with one embodiment of the present invention.

Embodiment(s) of the present invention is described herein in the context of a method, device, and apparatus for improving throughput of a common bus using a scheduling scheme and a read pending memory.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skilled in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A device arbitrates bus access to multiple direct memory access ("DMA") engines and multiple target modules ("TMs") for data transmission via a common bus. Each TM includes registers, memory devices, and a control circuitry, and is capable of generating a busy signal when additional time is needed for processing a data request. The device, in one embodiment, further includes an arbiter and a read pending memory, wherein the arbiter is configured to arbitrate bus access in accordance with a bus allocation scheme and the information stored in the read pending memory. The read pending memory is a storage memory for storing information indicating the status of read pending from DMA engines.

FIG. 1 is a block diagram illustrating a bus management 100 in accordance with one embodiment of the present invention. Bus management 100 includes a system 110, a system interface controller 120, an application logic component 130, a common bus 170, and multiple target modules ("TMs") 141-143, wherein application logic component 130 further includes multiple DMAs. In one embodiment, controller 120, application logic component 130, common bus 170, and TMs 141-143 are fabricated on a chip or manufactured on a card. System 110 is coupled to interface controller 120 via a bus or a network 150. It should be noted that the underlying concept of the exemplary embodiment(s) of the present invention would not change if one or more blocks (circuit or circuitries) were added to or removed from bus management 100.

TMs 141-143 are coupled to DMA engines via common bus 170 for data transmission. TMs 141-143, in one embodiment, are capable of processing data, such as data retrieving, data processing, data sending, and/or the like. Each TM, for example, performs one or more functions, which include, but are not limited to, processor modules, classifier modules, policing modules, and/or statistics modules. The information contained in TMs 141-143 can be accessed by various network devices connected to system 110 via common bus 170.

Common bus 170 is used to facilitate data or information transfer between computer subsystems such as TMs 141-143 and DMA engines. A bus can be considered as a computer subsystem, which transmits data or information between system components inside a system or computer or devices or between devices. Unlike a dedicated point-to-point connection, a common bus can logically couple to multiple devices or peripherals over the bus, which includes a set of wires. A bus access scheme is used to allocate which device or peripherals can read or write the data on the bus.

System controller 120 is coupled to system 110 through bus or communication connect 150 and is capable of managing communication between TMs 141-143 and system 110. System controller 120 transmits multiple operations such as data requests and/or data transfers to application logic component 130. System controller 120, for example, is capable of receiving requests or data requests issued by system 110 and subsequently, routing the requests to appropriate target module(s). When requested data is fetched by one or more of TMs 141-143 in response to the request(s), system controller 120 forwards the data to the destination(s). Bus 150, for instance, is a PCI express bus.

Application logic component 130 is coupled to system controller 120 through a bus or connection 160. Application logic 130 is capable of transmitting one or more data requests to TMs 141-143 via common bus 170 sequentially or simultaneously. After transmitting each request, application logic 130 redirects its resources to process next request operation. When application logic 130 receives a notification indicating the completion of the previously requested operation, it fetches the payload or data from common bus 170 accordingly. In one embodiment, redirecting resources includes interrupting and queuing capabilities. It should be noted that notification includes receiving an interrupt signal followed by data transfer.

The bus allocation scheme allocates and/or grants bus access or bus access permissions for accessing common bus 170 in response to a predefined selection algorithm. The bus allocation scheme manages the transmission of data requests across the common bus with reduced time delay and reduced error rate. The bus allocation scheme, for example, includes selecting a first data request from multiple data requests. It should be noted that the predefined selection algorithm can be a stream of equally partitioned time slots or substantially equally partitioned time slots, such as a round robin scheme or weighted round robin allocation schemes. Once a data request has been selected, application logic component 130 transmits the data request to its destination through common bus 170. Application logic includes multiple DMA engines. Once DMA engine gets grant to do data transfer, it can transfer data to or from any of the TM's via bus 170.

In operation, when TM0 141, for instance, is busy retrieving requested data from a memory and raises a busy signal, application logic releases the bus grant or bus access. Application logic component 130 subsequently, issues a new bus access to another DMA engine to access data from TM142 for processing a second data request while the first data request is being executed by a TM0 141. It should be noted that application logic component 130 utilizes the bus allocation scheme to reduce bus idle time. When TM0 141 or the first target module completes execution of the data request and the data is ready to be transmitted, application logic component 130 re-grants common bus access to same DMA engine which is waiting for data transfer from TM141. In an alternative embodiment, the first target module sends a signal to application logic component 130 indicating that it is done executing the first data request.

In one embodiment, the components of bus management system 100 are fabricated on a single chip, wherein the chip can be used in a router, switch, network device, and the like for data communication. An advantage of system 100 is to increase the throughput over a common bus with minimal additional hardware. It should be noted that TMs 141-143 share common bus 170 for data transmission and data corruption can occur if more than one target modules try to access common bus 170 at the same time. Allocation bus access in accordance with the bus allocation scheme can avoid potential data corruption and improve bus performance.

Figure 2A:
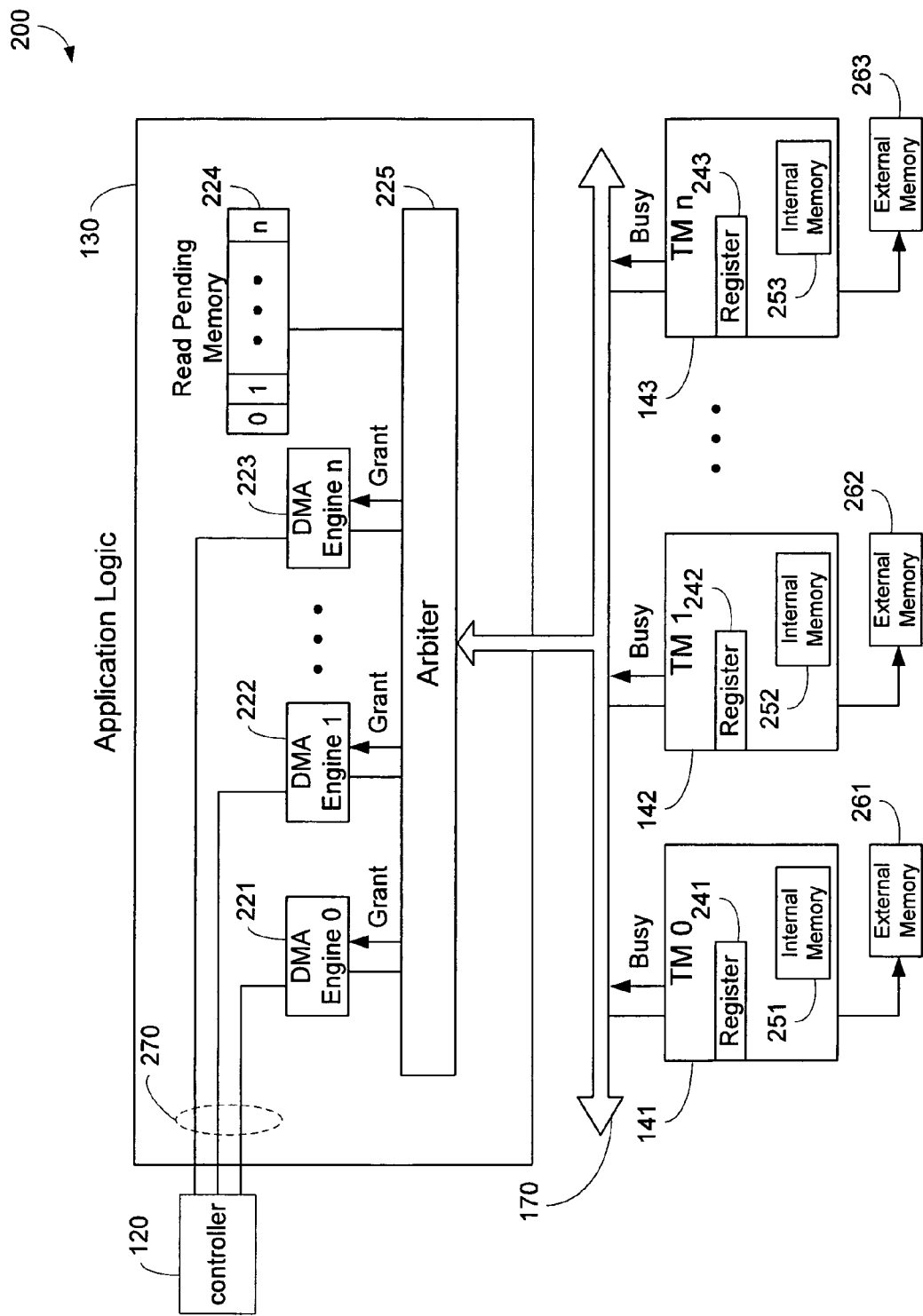
FIG. 2(A-B) is a block diagram illustrating a bus management system using a read pending memory in accordance with one embodiment of the present invention.

FIG. 2A is a block diagram illustrating a bus management system 200 having a read pending memory in accordance with one embodiment of the present invention. System 200 includes controller 120, application logic component 130, common bus 170, and TMs 141-143. Controller 120 is configured to communicate with application logic component 130 for data transfer. It should be noted that the underlying concept of the exemplary embodiment(s) of the present invention would not change if one or more blocks (circuit or circuitries) were added to or removed from system 200.

Referring back to FIG. 2A, application logic component 130 further includes multiple direct memory access ("DMA") engines 221 to 223, an arbiter 225, and a read pending memory 224. While DMA engines 221-223 are coupled with controller 120 via bus 270, they are also coupled to TMs 141-143 via common bus 170. DMA engines 221-223 control information transfers between a requesting device such as system controller 120 and a destination device such as a TM.

For example, upon receipt of a data request from controller 120, one of DMA engines 221-223 sends the request to one or more destination TMs 141-143. After notifying that the requested data is ready to be retrieved, the DMA engine fetches the requested data (or payload) and subsequently, passes the data to controller 120 to complete the request. The payload includes the requested data. It should be noted that a DMA engine suspends communication after receiving a request and re-establishes the communication with system controller 120 once the requested data is ready to be sent. An advantage of using DMA engines is to alleviate the central processing unit ("CPU") overhead thereby to enhance overall system performance.

Data requests, in one embodiment, are routed or directed to a DMA engine based on the accessibility of one or more DMA engines. For example, bus management system 200 sends a data request to DMA engine 221 because DMA engine 221 is designated to communicate with TM 141 since it has the requested data. Once the data request has been processed, DMA engine 221 informs controller 120 that the requested data is ready to be transferred. The data request is completed once system controller 120 receives the requested data.

Arbiter 225 is coupled to DMA engines 221-223 and TMs 141-143 via various connections and controls which DMA engine is allowed to access common bus 170. In one embodiment, arbiter 225 arbitrates an order of bus access in accordance with a bus scheduling or allocation scheme. A bus allocation scheme may be initiated by arbiter 225 to manage bus access to common bus 170. The bus allocation scheme can be time division multiplexed or weighted round robin, and it, for example, may be a round robin scheme, which uses equally partitioned time slots. The period of the equally or substantially equally partitioned time slots can be based upon the average time required to process a data request.

Target modules or TMs 141-143 include registers 241-243, internal memories 251-253, and external memories 261-263, wherein both internal memories 251-253 and external memories 261-263 are capable of storing data. It should be noted that the terms "target module" and "TM" are used interchangeably hereinafter. Depending on the data request, data corresponding to the data request can be retrieved from either internal memory or external memory. The target module is capable of asserting a busy signal if the time required for retrieving the data is greater than one of the partitioned time slots in accordance with the bus allocation scheme. Retrieving data from the external memory, for example, can take longer than the time allotted thereby the target module asserts a busy signal to indicate that extra time is needed to complete the request. Upon receipt of the busy signal, arbiter 225 reallocates common bus 170 to another DMA engine for a second data request. Once the data for the first data request has been retrieved from external memory 261 to the local storage locations such as register 241 or internal memory 251, target module 231 waits for arbiter 225 to issue bus access of common bus 170 for data transfer. When a common bus access is granted, the data is transmitted through common bus 170.

In one embodiment, data requests transmitted from DMA engines 221-223 can be received by the TMs 141-143. TMs 141 to 143 subsequently execute the data requests and transmit the resulting data back to DMA engines 221 to 223. During the execution of the data request, a TM processes the request by retrieving the data from either an external memory or internal memory. Retrieving data from an external memory generally takes longer time than retrieving data from an internal memory or register. In another embodiment, TMs 141-143 is capable of transmitting a busy signal to arbiter 225 notifying arbiter 225 regarding the status of the data request. The busy signal, for instance, is asserted when a target module broadcasts its operation status indicating that additional time is needed to complete the current operation of the request. It is to be understood that the term "an asserted state" is synonymous to "an active state." For example, the busy signal is activated when the target module is executing the data request, while the busy signal is deactivated when the target module has completed the execution.

Read pending memory 224 is configured to store information indicating the read status for DMA engines 221-223. Read status is used by arbiter 225 to control bus access in accordance with the bus allocation scheme. In one embodiment, read pending memory 224 include multiple bit storage memory storing read pending indicators, wherein each bit is associated with a target module. Alternatively, each read pending indicator corresponds to an individual DMA engine and indicates the read status of that DMA engine. For example, the read pending indicator provides information regarding the status between the DMA engine requesting the data and the target module retrieving the data from a memory device. The read status of the data request, in one embodiment, is stored as a single bit flip-flop. A single bit flip-flop is a one-bit storage element or one-bit latch that is capable of containing one of two logic states. For example, the single bit flip-flop is set to an active state when the corresponding DMA engine was unable to complete the request and the single bit flip-flop is set to an inactive state when the corresponding DMA engine completes its request. The arbiter can use the state of the read pending indicator in determining whether to grant bus access to a DMA engine.

System 200, in one embodiment, identifies which device (DMA engine) should be issued a bus grant in response to the information from arbiter 225, read pending memory 224, DMA engines 221-223, and the busy signals. Arbiter 225 performs the following algorithm to determine whether bus access will be granted to a selected DMA engine.

Bus access=DMA engine request OR (read pending indicator AND (NOT busy))

Accessing a common bus can be granted in two situations. In the first situation, access is granted if the selected DMA engine contains a bus request. The DMA engine subsequently transmits a data request to a target module via the common bus and the target module begins execution of the request. In the second situation, access to the bus is granted if the read pending indicator corresponding to selected DMA engine is in an active state and the busy signal associated to the target module, which processes the request, is in an inactive state.

A read pending indicator in an active state informs arbiter 225 that a previous request issued from the selected DMA engine has not been completed yet. Consequently, arbiter 225 grants the DMA engine a bus access of common bus 170 to complete the previous request. Before granting the bus access, however, arbiter 225 checks whether execution of the previous request has been completed or not. An inactive busy signal from the target module executing the request indicates that the requested data is currently stored in the register or a local storage and is ready to be transmitted. An active busy signal, on the other hand, indicates that the target module is still executing the request. Since the request has not finished execution, arbiter 225, in one embodiment, skips the current DMA bus allocation and grant bus access to another DMA engine to enhance bus utilization. System 200 improves throughput of a common bus by allowing other DMA engines to utilize the common bus when processing of a current data request extends beyond predefined time slots.

Figure 2B:
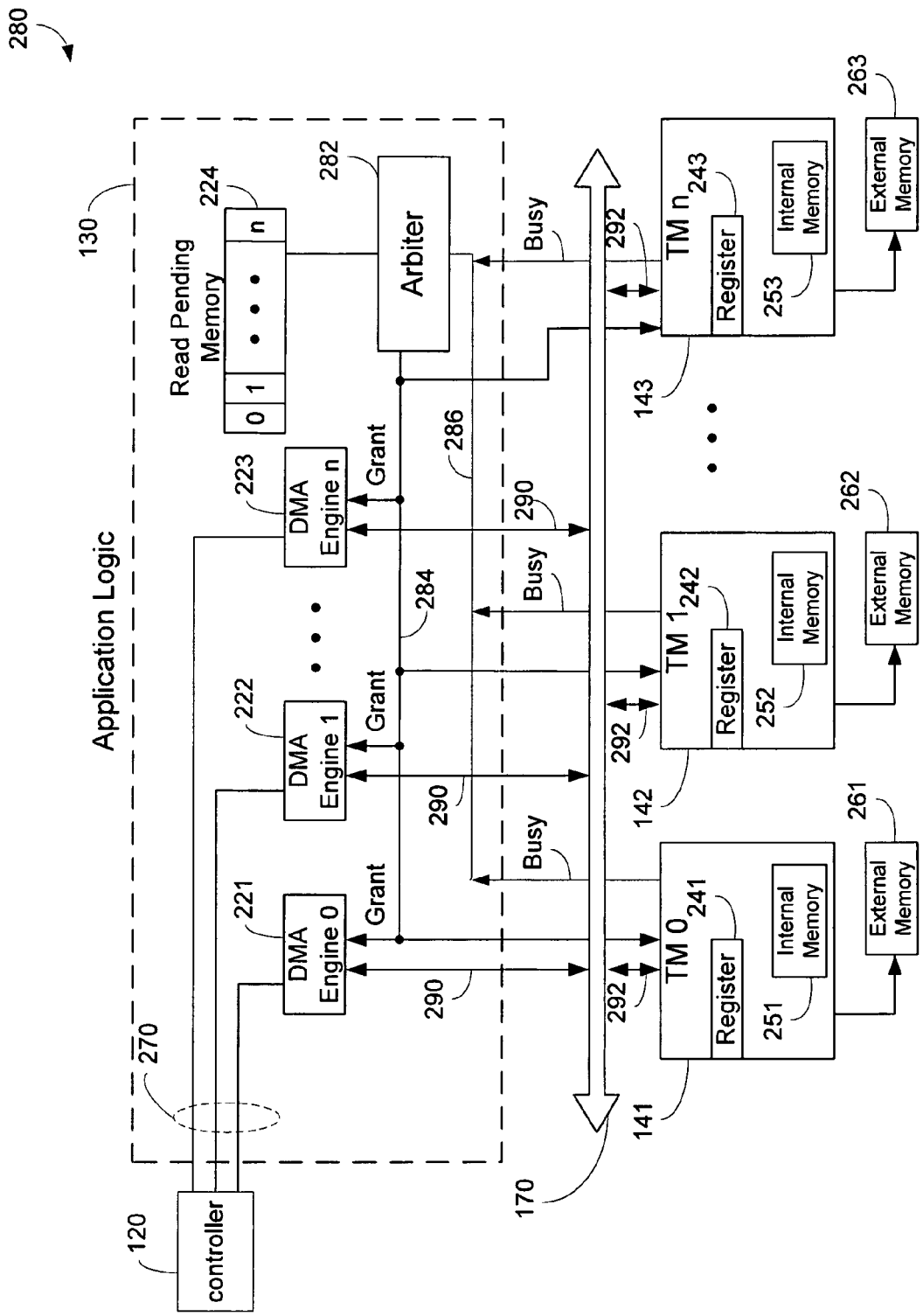

FIG. 2B is a block diagram illustrating another example of a bus management system 280 having a read pending memory in accordance with one embodiment of the present invention. System 280 includes controller 120, application logic component 130, common bus 170, and TMs 141-143. Controller 120 is configured to communicate with application logic component 130 for data transfer. It should be noted that the underlying concept of the exemplary embodiment(s) of the present invention would not change if one or more blocks (circuit or circuitries) were added to or removed from system 280.

System 280 illustrates similar functional components as system 200, shown in FIG. 2A, except that arbiter 282, which is different from arbiter 225. Arbiter 282 is an alternative configuration that performs substantially the same function as arbiter 225. Arbiter 282 is coupled to DMA engines 221-223 via bus 284 to send bus grant signals. Similarly, TMs 141-143 receive bus grants from bus 284 from arbiter 282. DMA engines 221-223 and TMs 141-143 are connected to common bus 170 via connections 290-292. Devices (DMA or TM) with bus grant(s) can access common bus 170. It should be noted that arbiter 282 receives busy signals via bus 286.

DMA engines 221-223 can act as either transferring ("Tx") or receiving ("Rx") engine. A Tx DMA engine transfers data from chip target modules to system controller 120 and Rx DMA engine transfers data system controller 120 to chip target modules. To transfer data from/to target modules, each DMA engine needs to arbitrate for common data bus such as common bus 170. As described earlier, arbitration technique can be a round robin scheme in which each engine is given the same weight age.

In case of an Rx DMA engine, controller 120 transmits data to DMA engine memory and then, Rx engine obtains bus access of common bus 170 to transfer the data to target module. In case of a Tx DMA engine, engine needs to arbitrate for common bus to get data from target module. Upon receipt of a whole packet, DMA engine transfers the data to system controller 120. When multiple requests come from DMA engines to arbiter, system 280, in one embodiment, provides a bus grant to one engine based on round robin scheme. DMA engine then transfers the payload or request for payload from target module. To transfer payload from a target module, depending on whether the data is stored at register file or internal memory or external memory, TM can take few cycles to hundreds of cycles to retrieve the requested data. Each target module has a busy signal to notify arbiter that it is busy in processing the request. If target module asserts busy signal, arbiter, for example, can release bus and assign grant to another DMA engine. System 280 enhances bus efficiency while reduces bus idling. Arbiter 282, in one embodiment, keeps in memory for all read pending for DMA engines. When next time during arbitration, even if no request is there but read is pending with busy signal deasserted, arbiter gives bus back to DMA engine whose read is pending.

Figure 3:
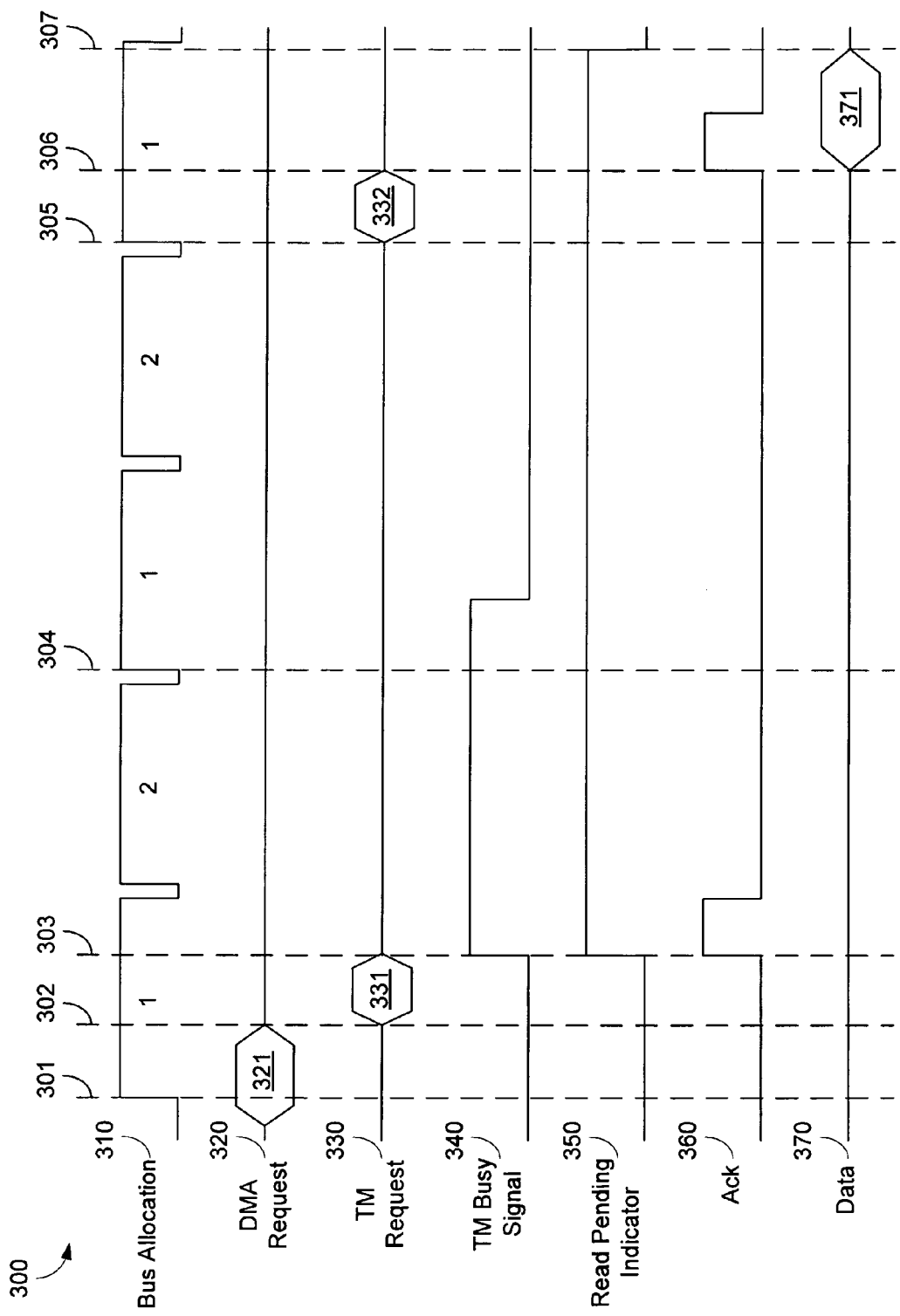
FIG. 3 is a timing diagram illustrating an implementation of a bus management system in accordance with one embodiment of the present invention.

FIG. 3 is a timing diagram illustrating an implementation of a bus scheduling system in accordance with one embodiment of the present invention. Bus allocation signal 310 includes multiple substantially equally partitioned time slots or clock cycles. In this example, bus allocation signal 310 utilizes a round robin scheme wherein the time slots alternate between a first and a second DMA engine, indicated by digits 1 and 2. During the positive edge of the time slot, an arbiter queries the selected DMA engine for a command.

At time 301, the arbiter selects the first DMA engine according to bus allocation signal 310 and queries the DMA engine for a bus request. A bus request exists if the DMA engine contains a data request desiring access to the common bus. A data request may originate from a system controller while a bus request may originate from a DMA engine. Referring back to FIG. 3, bus request 321 exists at time 301 on DMA request signal 320. Since the DMA engine contains a bus request at the beginning of the partitioned time slot, the arbiter grants the common bus access to the first DMA engine. The DMA engine is now able to transmit data requests on the common bus. In one embodiment, the DMA engine transmits the data request to the arbiter. The arbiter subsequently forwards the data request to the target module identified in the data request. In another embodiment, the DMA engine transmits the data request directly to the target module identified in the data request.

At time 302, the arbiter transmits a target module request 331 to a target module. The arbiter provides target module request signal 330, which informs the target module that it has access to the common bus. Once the target module acknowledges this access, the data request may be transmitted to the target module. At time 303, the target module has received the data request. In response to the data request, the target module transmits asserted acknowledgement signal 360 to indicate that the data request has been received. The target module may conclude, through analysis of the data request, that this data request will require additional time and therefore, activate busy signal 340. Upon receiving the busy signal, the arbiter sets read pending indicator 350 to an active state to indicate that the first DMA engine contains a pending read request.

At time 304, the arbiter selects the first DMA engine for the second time in accordance with bus allocation signal 310. The arbiter checks DMA request signal 320 to determine whether a request exists. Since DMA request signal 320 does not contain a request, the arbiter queries the read pending memory for the existence of a pending data request within the first DMA engine. Asserted read pending indicator 350 at time 304 indicates that a pending read exists within the target module. In response to this knowledge, the arbiter queries busy signal 340 to determine whether the target module is still executing the command. Since busy signal 340 is still asserted at time 304, the data is not ready. The arbiter proceeds to not assign the common bus to the first DMA engine during this time slot.

At time 305, the arbiter selects the first DMA engine for the third time according to bus allocation signal 310. Similar to time 304, DMA request signal 320 does not contain a request and read pending indicator 350 is asserted. However, busy signal 340 is no longer asserted at time 305, thereby informing the arbiter that the data is ready. As such, the arbiter grants a common bus access to the DMA engine based on the combination of DMA request signal 320, read pending indicator 350, and target module busy signal 340. The DMA engine subsequently transmits target module request 332 to the target module at time 305. Consequently, the DMA engine transmits the data request to the target module.

At time 306, upon completion of the transmission of the data request from the DMA engine to the target module, acknowledgement signal 360 is asserted. Data 371 is subsequently transmitted from the target module to the DMA engine through data signal 370. At time 307, the completion of the data transmission triggers the arbiter to release the DMA engine's access to the common bus. The read pending indicator should also be cleared at this time.

The exemplary embodiment of the present invention includes various processing steps, which will be described below. The steps of the embodiment may be embodied in machine or computer executable instructions. The instructions can be used to cause a general purpose or special purpose system, which is programmed with the instructions to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 4:
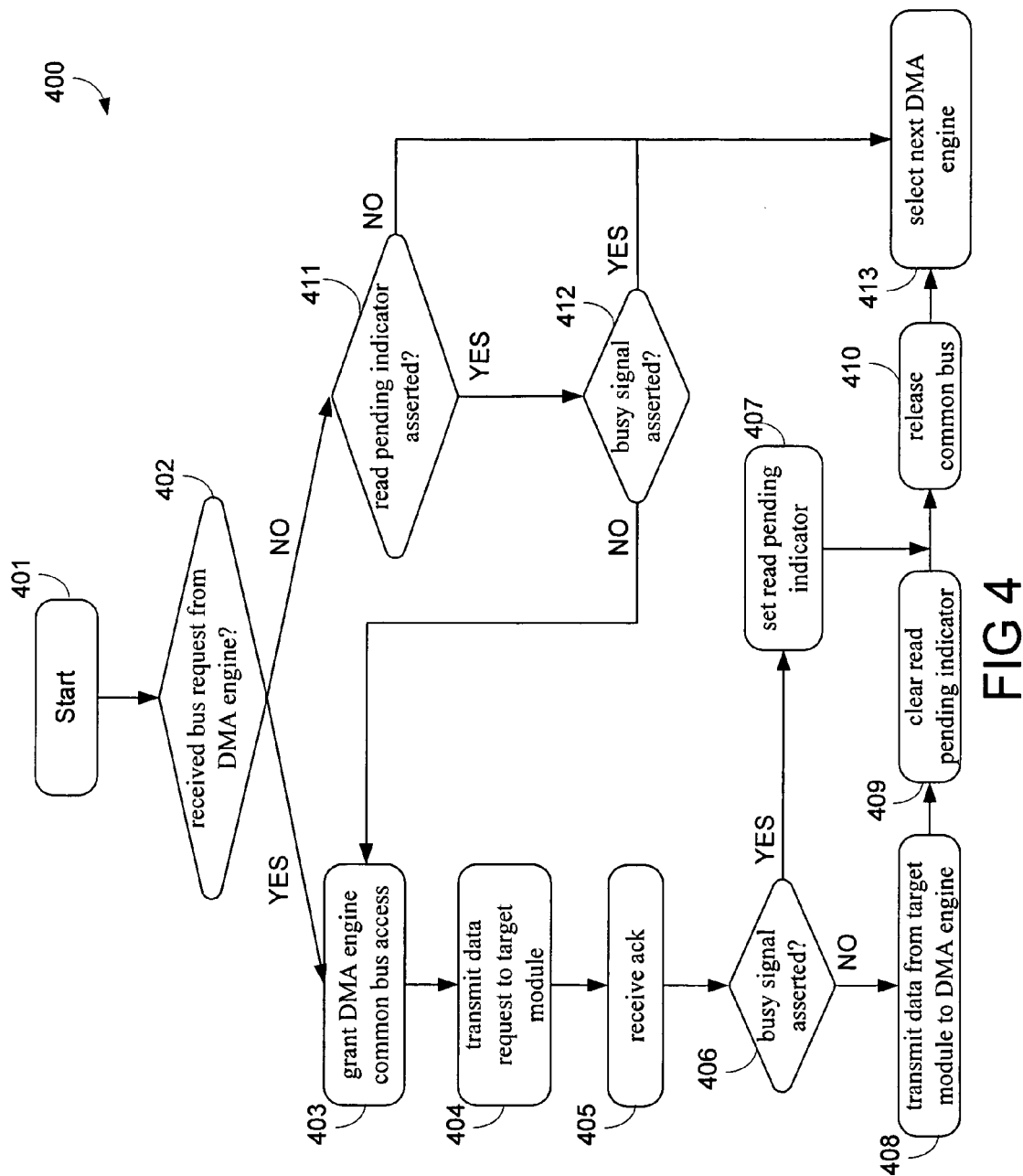
FIG. 4 is a flowchart illustrating a method of scheduling access to a bus in accordance with one embodiment of the present invention.

FIG. 4 is a flowchart illustrating a method of scheduling access to a bus in accordance with one embodiment of the present invention. Flowchart 400 describes a series of steps an arbiter may make in scheduling access to a common bus. One skilled in the art may rearrange or add additional steps to flowchart 400 to achieve similar results. At step 401, the arbiter begins by selecting a DMA engine via a bus allocation scheme. At 402, the arbiter queries the DMA engine for a bus request. If a bus request exists, the arbiter grants the common bus to DMA engine at step 403. At step 404, the data request is transmitted to the target module. Once the data request has been received by the target module, the arbiter receives an acknowledgment from the target module at step 405 to notify the arbiter that the data request was successfully received.

At step 406, the arbiter queries the busy signal of the target module. If the busy signal is asserted, the arbiter sets and stores a read pending indicator corresponding to the DMA engine to an active state at step 407. The read pending indicator informs the arbiter at a later time that a data request is still pending in the target module. In one embodiment, the read pending indicator is stored in a read pending memory coupled to the arbiter. After setting the read pending indicator, the arbiter releases the common bus at step 410 and selects to the next DMA engine at step 413. If the busy signal is not asserted, the arbiter delegates the data transmission from the target module to the DMA engine at step 408. In one embodiment, this may involve routing the data through the arbiter. Upon completing the data transmission, the arbiter clears the read pending indicator at step 409, releases the common bus at step 410, and goes to the next DMA engine at step 413.

If a bus request does not exist in the DMA engine, the arbiter determines whether a previous request issued by the DMA engine is still pending. At step 411, the arbiter queries the read pending indicator corresponding to the DMA engine. If the read pending indicator is not asserted, a pending request does not exist. Consequently, the arbiter selects the next DMA engine at step 413. However if the read pending indicator is asserted, then the arbiter queries the busy signal of the target module executing the pending request to determine whether the pending request is executed. If the busy signal is asserted, then the target module has not completed retrieving the data and therefore, the arbiter moves on to the next DMA engine at step 413. If the busy signal is not asserted, then the data is ready to be transmitted to the DMA engine. Accordingly, the arbiter grants the DMA engine access to the common bus at 403 and begins transmitting the data to the DMA engine as described above.

FIG. 5 is a flowchart 500 illustrating a process of scheduling access to a bus in accordance with one embodiment of the present invention. At block 502, the process receives a bus request for data transfer from a DMA engine to a TM. In one embodiment, the process initiates a bus allocation scheme for scheduling bus access. In one example, the bus allocation scheme includes activating a round robin scheme. In another example, the bus allocation scheme includes generating substantially equally partitioned time slots. After block 502, the process proceeds to the next block.

At block 504, the process detects a busy signal from the TM. The busy signal, in one embodiment, is used to request additional time for retrieving data. The TM may require additional time to retrieve the data from a memory device, which may be internal or external memory. The busy signal is set to an active state if the time required to retrieve the data is greater than one of substantially equally partitioned time slots. In one example, the substantially equally partitioned time slots are set to an average time required to process a bus request for data transfer from the TM to the DMA engine. The busy signal is deactivated once the data from the memory device is ready to be transmitted. After block 504, the process proceeds to the next block.

At block 506, the process stores a read pending indicator in a read pending memory. In one embodiment, the read pending indicator is stored in response to the busy signal. For example, the process activates the read pending indicator in response to an active busy signal. After block 506, the process proceeds to the next block.

At block 508, the process transfers the data from the TM to the DMA Engine. In one embodiment, the transfer is initiated in response to the read pending indicator and the busy signal. The read pending indicator from the read pending memory informs the process that an incomplete data request exists while the busy signal from the TM informs the process that data resulting from the data request is now ready to be transmitted. For example, the transfer may be initiated upon detecting the read pending indicator in an active state and the busy signal in an inactive state. After block 508, the process ends.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for bus accessing, comprising:
   receiving a first bus request for first data from a first direct memory access ("DMA") engine to a first target module ("TM");
   allocating a single data bus to the first DMA engine;
   setting a first busy signal from the first TM to an active state base on time required to retrieve the first data is greater than one of a plurality of equally partitioned time slots;
   detecting the first busy signal from the first TM requesting additional time for retrieving the first data;
   setting a first read pending indicator in a read pending memory in response to the first busy signal;
   releasing the single data bus in response to the first busy signal and setting of the first read pending indicator;
   continuing retrieving the first data from a memory device to the first TM while the single data bus is allocated to another DMA engine after the single data bus was released; and
   reallocating the single data bus back to the first DMA engine for transferring the first data from the first TM to the first DMA engine when the first busy signal is deactivated.

2. The method of claim 1, further comprising initiating a bus allocation scheme.

3. The method of claim 2, wherein initiating the bus allocation scheme further includes activating a round robin scheme.

4. The method of claim 2, wherein the initiating the bus allocation scheme further includes generating equally partitioned time slots.

5. The method of claim 1, wherein the memory device is one of an internal and an external memory.

6. The method of claim 1, wherein the equally partitioned time slots are set to an average time required to process a bus request for data transfer from the first TM to the first DMA engine.

7. The method of claim 1, further comprising setting the first busy signal from the first TM to an inactive state once the first data from the memory device is ready to be transmitted.

8. The method of claim 1, wherein setting the first read pending indicator further comprises setting the first read pending indicator to an active state in response to an active first busy signal.

9. The method of claim 1, further comprising transferring the first data from the first TM to the first DMA engine in response to the first read pending indicator and the first busy signal.

10. A bus scheduling device, comprising:
a single bus configured to transmit data;
a plurality of direct memory access ("DMA") engines coupled to the single bus and transmitting a data packet to a system controller, wherein a first DMA engine transmits a first bus request for a first data to a first target module ("TM");
a plurality of TMs coupled to the single bus wherein one of the plurality of TMs transmits the data packet to one of the plurality of DMA engines, wherein the data packet includes the first data, and the first TM provides a first busy signal to request additional time for retrieving the first data from a memory device to the first TM, as time required to retrieve the first data is greater than one of a plurality of equally partitioned time slots;
a read pending memory coupled to the bus and storing information indicating read status for the plurality of DMA engines, wherein a first read pending indicator is set in response to the first busy signal; and
a bus arbiter coupled to the single bus and scheduling bus access in response to a bus allocation scheme and the information stored in the read pending memory, wherein the single bus is allocated to the first DMA engine for the first data and is released in response to detecting the first busy signal and setting the first read pending indicator, the single bus is then allocated to another DMA engine after the release, and the single bus is then reallocated back to the first DMA engine for transferring the first data from the first TM to the first DMA engine when the first busy signal is deactivated.

11. The bus scheduling device of claim 10, wherein one of the plurality of TMs includes:
a memory device containing the data packet;
a control circuitry generating a busy signal for requesting additional time for retrieving the data packet from the memory device; and
a register for holding the data packet read from the memory device.

12. The bus scheduling device of claim 11, wherein the read pending memory stores the read status of one of the plurality of TMs when the busy signal is in an active state.

13. The bus scheduling device of claim 11, wherein the busy signal is in an active state when the time for retrieving the data packet from the memory device is larger than a partitioned time slot.

14. The bus scheduling device of claim 11, wherein the busy signal is in an active state when the memory device is an external memory.

15. The bus scheduling device of claim 11, wherein the busy signal is in an inactive state when the register receives the data packet.

16. The bus scheduling device of claim 11, wherein the read pending memory includes a plurality of read pending indicators, wherein a read pending indicator is configured to indicate a status of a data request from one of the plurality of DMA engines.

17. The bus scheduling device of claim 16, wherein the read pending indicator is a one bit flip-flop located in the read pending memory, the flip-flop in an active state when the busy signal of a first TM is in an active state in response to a first data request from a first DMA engine.

18. The bus scheduling device of claim 16, wherein the arbiter further includes:
a selector for selecting one of the plurality of DMA engines in accordance with the bus allocation scheme; and
an input for reading the read pending indicator;
wherein if the read pending indicator is in an active state and the busy signal from a first TM is in an inactive state, the arbiter grants the first TM access to the bus and transmits the data packet to a first DMA engine.

19. The bus scheduling device of claim 10, wherein the bus allocation scheme includes a round robin scheme between the plurality of DMA engines.

20. An apparatus for bus accessing, comprising:
means for receiving a first bus request for first data from a first direct memory access ("DMA") engine to a first target module ("TM");
means for allocating a single data bus to the first DMA engine;
means for setting a first busy signal from the first TM to an active state base on time required to retrieve the first data is greater than one of a plurality of equally partitioned time slots;
means for detecting the first busy signal from the first TM requesting additional time for retrieving the first data;
means for setting a first read pending indicator in a read pending memory in response to the first busy signal;
means for releasing the single data bus in response to the first busy signal and setting of the first read pending indicator;
means for continuing retrieving the first data from a memory device to the first TM while the single data bus is allocated to another DMA engine after the single data bus was released; and
means for reallocating the single data bus back to the first DMA engine for transferring the first data from the first TM to the first DMA engine when the first busy signal is deactivated.

21. The apparatus of claim 20, further comprising means for setting the first busy signal from the first TM to an inactive state once the first data from the memory device is ready to be transmitted.

* * * * *